Figure 1:
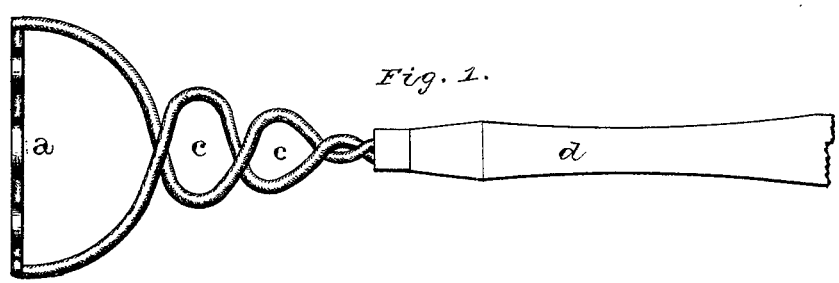
Figure 2:
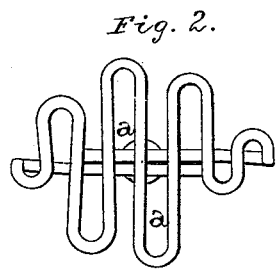

A. HUFFER.
POTATO MASHER.

No. 180,767. Patented Aug. 8, 1876.

WITNESSES.

INVENTOR.

UNITED STATES PATENT OFFICE.

ABRAHAM HUFFER, OF HAGERSTOWN, MARYLAND.

IMPROVEMENT IN POTATO-MASHERS.

Specification forming part of Letters Patent No. 180,767, dated August 8, 1876; application filed February 8, 1876.

*To all whom it may concern:*

Be it known that I, ABRAHAM HUFFER, of Hagerstown, in the county of Washington and State of Maryland, have invented certain new and useful Improvements in Vegetable Beater and Stirrer; and I do hereby declare the following to be a full, clear, and exact description of the invention, such as will enable others skilled in the art to which it pertains to make and use it, reference being had to the accompanying drawings, which form part of this specification.

My invention relates to an improvement in vegetable beaters and stirrers; and it consists in forming the base and shank from a single piece of wire, and making one, two, or more openings in the shank, at any suitable distance above the base, so that the implement can be used in stirring the vegetable or other substance after it has been beaten or mashed sufficiently. By means of this implement, potatoes, pumpkins, turnips, and other vegetables and substances, can be thoroughly mashed and then stirred, so as to make them light, and of any desired consistency.

The accompanying drawings represent my invention.

I first take a piece of wire of any desired length and thickness, and bend it in the shape of corrugations, so that the wire runs back and forth, as shown, and thus form the base $a$, which is to be used in beating or mashing the vegetable or other material. The ends of the wire are then turned upward and crossed back and forth over each other at a suitable distance above the base, so as to form any desired number of openings $c$. These openings serve, after the vegetable has been sufficiently beaten or mashed, to assist in stirring, and thoroughly breaking it up by causing it to pass through them, as the implement is carried around and around by the hand. Where these openings are not formed, the shank alone, or the shank and base together, do not offer either sufficient or the proper kind of surface to the material, and hence they fail to give it the proper stirring. Above the openings $c$ the ends of the wires are twisted together, and then inserted into a common wooden handle, $d$.

Having thus described my invention, I claim—

A vegetable stirrer and masher, consisting of the base $a$, shank having the opening $c$ through it, the base and shank being formed from a single piece of wire, substantially as shown and described.

In testimony that I claim the foregoing I have hereunto set my hand this 3d day of February, 1876.

A. HUFFER.

Witnesses:
 ROBT. M. BARR,
 FRANK N. TICE.